United States Patent [19]
Möddel

[11] 3,982,871
[45] Sept. 28, 1976

[54] METHOD AND DEVICE FOR FORMING A SOCKET ON A PLASTIC TUBE

[76] Inventor: Adolf Möddel, Bernhard Lohmann Strasse 29, Darme, Germany

[22] Filed: Feb. 20, 1974

[21] Appl. No.: 444,244

Related U.S. Application Data

[62] Division of Ser. No. 863,612, Oct. 3, 1969, abandoned.

[30] Foreign Application Priority Data

Oct. 3, 1968 Germany................ 6800552[U]

[52] U.S. Cl................. 425/393; 264/318; 425/DIG. 218
[51] Int. Cl.²................ B29C 17/00
[58] Field of Search ........... 425/393, 392, 403, 387, 425/389, 394, DIG. 218; 264/94; 72/58

[56] References Cited
UNITED STATES PATENTS

| | | | |
|---|---|---|---|
| 2,458,854 | 1/1949 | Hull et al. ................ | 72/58 |
| 3,184,524 | 5/1965 | Whiteford ................ | 264/292 X |
| 3,325,860 | 6/1967 | Hansen ................ | 264/98 |
| 3,432,887 | 3/1969 | Poux et al. ................ | 425/393 X |
| 3,570,065 | 3/1971 | Guerrero ................ | 425/393 |
| 3,708,253 | 1/1973 | Lemelson ................ | 425/393 X |

*Primary Examiner*—Francis S. Husar
*Assistant Examiner*—Robert J. Charvat
*Attorney, Agent, or Firm*—Haseltine, Lake & Waters

[57] ABSTRACT

An installation for forming a tube of thermoplastic material with a socket having an external bead thereon, by pushing the tube end on a mandril consisting of two, spaced apart, axially movable mandril parts, and moving the two mandril parts towards each other while the outer surface of the tube is gripped by a mould having an internal recess corresponding to the bead to be formed on the tube. Compressed air, a compressible expandable rubber body, die or an inflatable rubber body is present in the space bounded by the two mandril parts and the inner surface of the tube. The length of the tube between the two mandril parts in their initial position is at least equal to the length of the bead to be formed.

9 Claims, 5 Drawing Figures

METHOD AND DEVICE FOR FORMING A SOCKET ON A PLASTIC TUBE

CROSS-RELATED APPLICATION

This application is a division of copending application Ser. No. 863,612 filed Oct. 3, 1969 now abandoned and claiming the priority of German application 6,800,552 filed Oct. 3, 1968.

The invention relates to a device for forming a socket with a circumferential bead on the wall of a tube made of thermoplastic material.

For the formation of such sockets it is known to press a removable mandril, formed to correspond to the eventual shape of the socket, in an axial direction into the heated end of the tube and to remove the mandril after it has been disassembled.

It is further known to form the bead by applying high pressure to the tube by a compressed gas to deform the wall of the tube into a recess. In both cases, a weakening of the strength of the wall of the tube in the area of the bead is produced. It is an object of the invention to provide a simple and efficient apparatus of the aforementioned kind which allows the formation of the bead without impairing the strength of the wall.

According to the invention, a device is provided for forming a socket with a circumferential bead on the wall of a tube made of thermoplastic material, said device comprising a receiving mandril consisting of two part related to the shape of a socket end to be formed on the end of the tube, the two parts being axially movable with respect to one another and bounding together a cylindrical chamber therebetween, and a mould having an inner surface which corresponds to the final shape of the socket and bead.

Preferably the device is provided with or can be connected to means for exerting a pressure on the wall of the tube from the inner surface of said cylindrical chamber.

By connecting the cylindrical chamber with a medium under pressure the wall of the plastic tube is made to conform exactly with the form of the internal recess of the mould.

It has been found that good results can be obtained by introducing a block or ring of a deformable material, such as rubber, plastic and the like in said cylindrical chamber in order to shape the bead.

Further features and advantages are disclosed with reference to the drawing, in which, FIG. 1 represents an embodiment of a device according to the invention before closing the mould;

Figure 1:
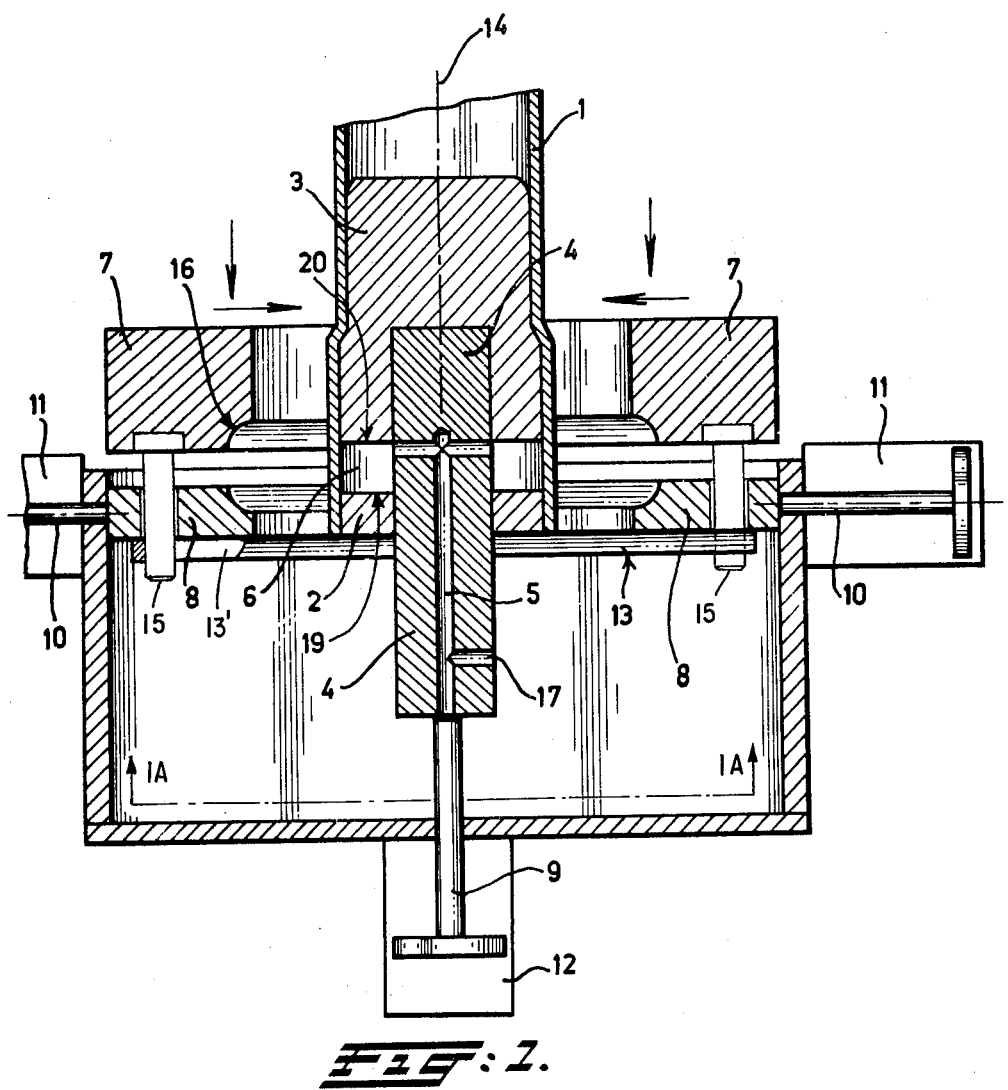
FIG. 1a is a section taken along line IA—IA in FIG. 1.
Figure 1A:
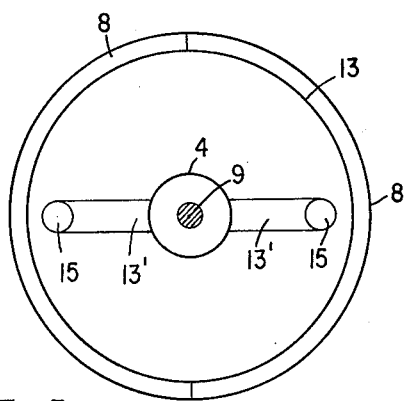
Figure 2:
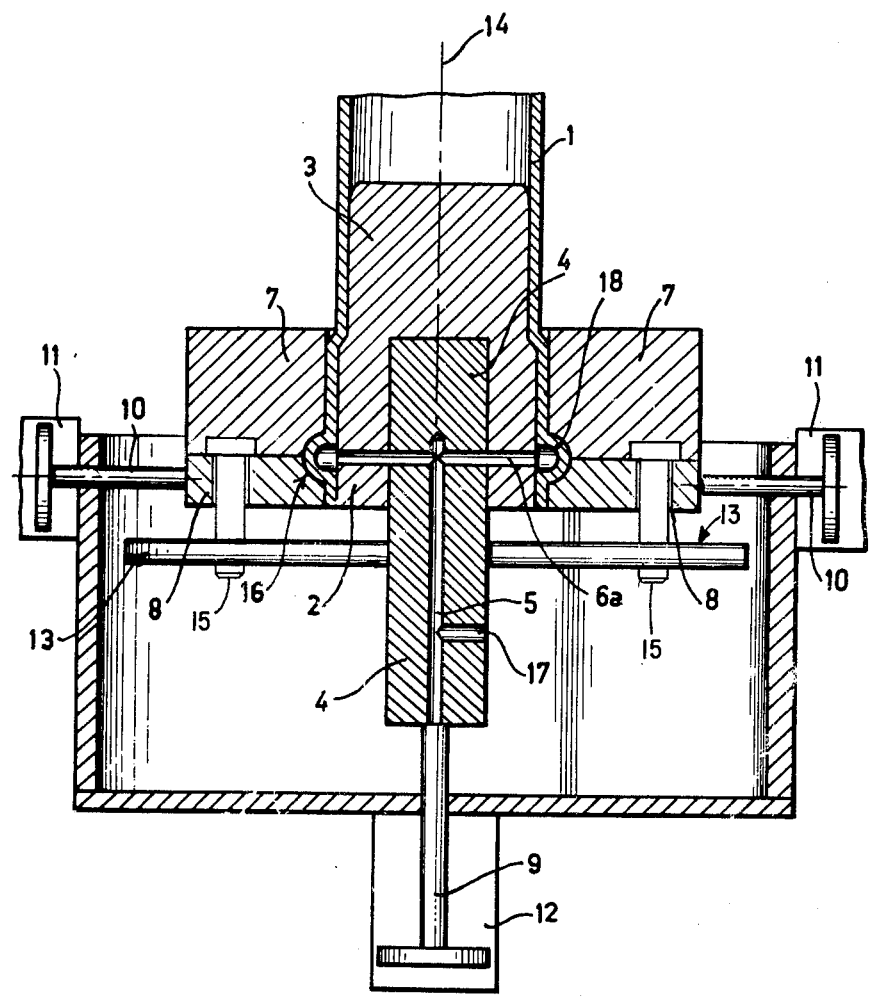
FIG. 2 shows the device of FIG. 1 in its final operative position.

According to FIGS. 1 and 2 a heated tube and 1, which consequently is capable of plastic deformation e.g. made of polyvinylchloride or polyethylene is introduced into a device for forming a widened out socket portion at the end of the tube, the device being in the initial operative position as represented in FIG. 1. The tube end 1 is slid on a receiving mandril consisting of two mandril parts 2 and 3, the shape of the mandril conforming to the shape of the socket. The part 2 of the mandril consists of a stationary annular body, through the central recess of which protrudes slidably a shaft 4 to which the part 3 of the mandril is secured. The latter part 3 acts as an abutment as will be seen later. The shaft 4 is provided with passage 5 for flow of a compressed medium, which passage on the one hand is connected to a source of compressed medium, especially a source of compressed air (not shown), and on the other hand opens into an annular chamber 6 between the mandril parts 2, 3. The supply of the compressed medium is controlled via valves, or the like, which can be operated by hand or by means of control drives in dependence on the progress of motion of the device.

Associated with each mandril parts 2 and 3 is a pair of moulding jaws 8, 7 respectively, the moulding jaws 7, 8 constituting together a mould or die e.g. a blast mould. The pair of moulding jaws 8 is axially stationary, and the jaws are radially movable in opposite directions from an initial position into an operative position and vice versa. The pair of moulding jaws 7, on the contrary, axially movable, and additionally the jaws 7 may perform a radial movement together with the jaws 8 and synchronous therewith. In order to move the jaws 8, reversible pneumatic jacks 11 are connected thereto, the piston rods 10 of which are coupled to the jaws 8 to thereby ensure their immobility in an axial direction. The axial drive of the jaws 7 is synchronously coupled to that of the mandril part 3, and shaft. A reversible pneumatic jack 12, the piston rod 9 of which is axially secured to the outer end of the shaft 4, is provided in order to axially slide the mandril part 3 and the shaft 4. This shaft carries one or more radial bridge members 13 in the shape of a plate or two radial struts which each are provided with a radial slit 13'. The axis of the slit extends in an axial plane containing the axis 14 of the device through the axis of the piston rod 10. Slidably guided on each of the radial slits 13' is an axial guide bolt 15. The axial guide bolts 15 protrude through bores in the jaws 8 and are secured to the jaws 7. They serve to take along the jaws 7 when the jaws 8 are moved and act as guides and carriers for the jaws 7 when the mandril part 3 and shaft 4 are actuated via drive 12, 9. In the closed or operative position of the jaws 7, 8 represented in FIG. 2 of the drawing, the jaws 7 and 8 constitute a closed annular body which is clamped on the outer wall of the socket end of tube 1. The jaws jointly define an annular recess 16 situated at the level of the annular chamber 6 and related to the shape of the bead to be formed on the socket.

For performing the moulding operation, the jaws 7 and 8 are moved toward each other, starting from the position of the device, whereby the pairs of jaws 7, 8 clamp the heated tube and 1 under pressure. Thereupon, simultaneously and in concert by means of their drives the pair of jaws 7 is axially moved toward the pair of jaws 8 and the part 3 of the mandril is moved toward the part 2 of the mandril. Hereby the free unclamped region of the tube end 1, situated at the level of the annular chamber 8 and the annular recess 16, is deformed under the axial driving pressure. This free region of the tube bulges outwardly, and deforms downwardly respectively. By means of compressed air (simultaneously or preferably immediately thereafter) the tube area deformed by the axial movement to pressed into the annular chamber 16 as shown in FIG. 2.

The pairs of jaws 7, 8 are thereupon again radially returned to their starting position and the pipe is taken from the receiving mandril. After return of the jaws 7, 8 to their radial starting position and before or after the removal of the pipe, the jaws 7 and the part 3 of the mandril are also moved back to their initial position.

Preferably, the difference between the distance between the end 20 of mandril part 3 and the end 19 of mandril 2 in the initial position of the device and the final operative position of the device corresponds to more than the length of tube required in forming the bead. In this manner the bead is obtained without thinning or otherwise weakening the tube wall.

Figure 3:
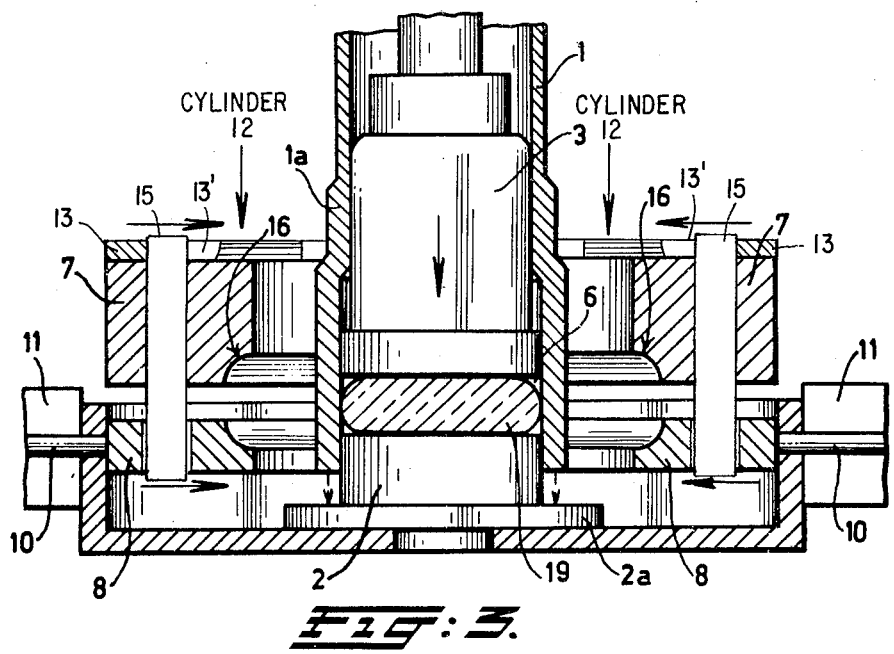
FIG. 3 represents another embodiment of a device before closing the mould.
Figure 4:
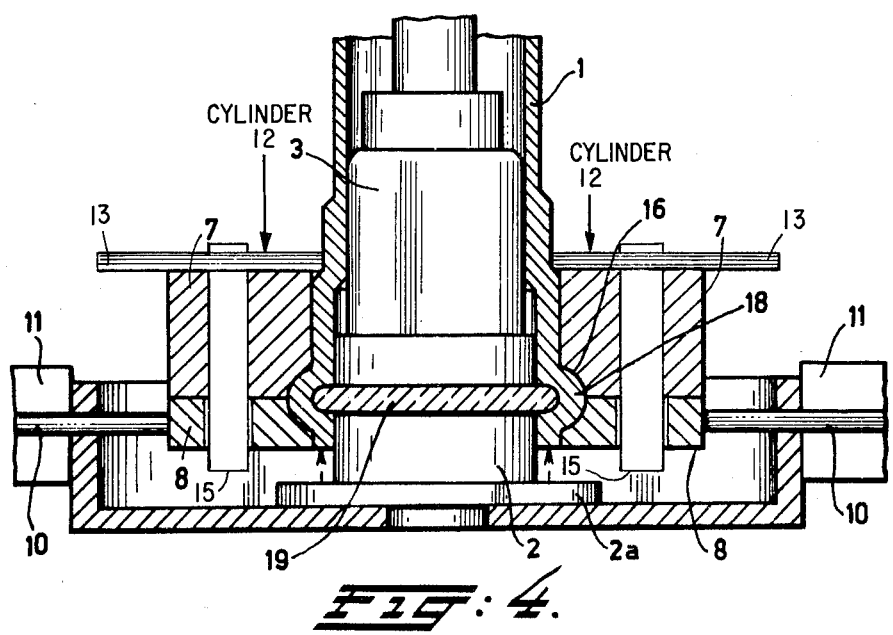
FIG. 4 shows the device of FIG. 3 in its final operative position.

FIGS. 3 and 4 show another embodiment of a device for forming the bead. Instead of compressed air, a rubber body 19 is used as a pressure medium. By moving the mandril parts 2 and 3 towards each other, a rubber ring or body 19 is caused to expand in a radial direction to assist in the proper forming of the bead against the inner surface of the outer split mould. It will be obvious that it is also possible to use a rubber body filled with a compressed medium, such as air, or to expand the rubber body by introducing a medium, such as air, into a rubber ring or body.

The plastic tube end is then solidified in this condition by cooling. The moving part or parts 2 and/or 3 of the mandril are then moved in the opposite direction causing movement of the tube socket from the fixed part of the mandril and also causing the rubber ring 19 to return to its initial shape and form.

The use of a sleeve or tube of thermoplastic material has been used to reinforce injection moulded pipe joints. The sleeve with the basic shape is indicated at 1a in FIGS. 3 and 4.

The forming mandril may be advantageously heated before the tube is pushed thereon to prevent premature solidification of the tube end. Advantageously, hydraulic devices may be used to push the tube and onto the mandril on the mandril into the tube end 1. The tube may also be removed from the mandril by a hydraulic device.

According to a preferred embodiment, the free end 1a of the tube is pushed onto mandril parts 3 and 2 until contact is made with the stop 2a. This stop ensures the correct depth of the socket and assists in the formation of the bead.

Instead of using a rubber body or a compressed medium for conforming the bead 18 to the recess 16, one may use a die composed of die parts which are expanded by introducing a conical member along the axis of the die parts.

The rubber body 19 should be made of a rather rigid rubber material in order to shape the bead but it should not substantially decrease the wall thickness of the tube 1. Of course, a heat resistant rubber may be used if desired.

What we claim is:

1. Apparatus for forming a socket with an annular external bead on a length of tubular pipe of thermoplastic material, said apparatus comprising a mandril constituted by two spaced parts which are movable axially relative to one another, said mandril having an outer surface which is shaped to form a socket on the pipe when the mandril is inserted into the pipe to deform the same, a mold positioned around said pipe in opposition to said parts of the mandril, said mold including two pairs of axially spaced jaws each associated with a respective part of said mandril and including two jaw members radially movable towards the pipe, said pairs of jaws also being movable axially relative to one another, means connected to at least one of said pairs of jaws for moving said two pairs of jaws radially inwards to clamp the pipe against said parts of the mandril at axially spaced locations, means connected to one of said mandrel parts for axially moving one pair of said jaws and associated mandril part with respect to the other pair of said jaws and mandril part to cause said pairs jaws to abut against one another and move the parts of the pipe, at the locations where they are clamped by the jaws and mandril parts, towards one another to upset the pipe between said locations, said jaws being provided with grooves defining an annular cavity when the jaws abut one another, said annular cavity defining the shape of the bead for the pipe when the jaws are clamped against the pipe and have been axially moved into contact with one another, and means between said mandrel parts for applying internal pressure against said pipe in the region between said locations to urge the upset portion of the pipe outwardly into conformance with said annular cavity in the jaws.

2. Apparatus as claimed in claim 1 wherein said means for applying internal pressure on the pipe comprises an elastic member disposed between the mandril parts, for being deformed by said parts when the parts are axially moved towards one another.

3. Apparatus as claimed in claim 1 wherein said means for applying internal pressure on the pipe comprises means for supplying a compressed medium between said parts.

4. Apparatus as claimed in claim 1 comprising an axially displaceable shaft fixed to one of said mandril parts, and means connected to said shaft for moving said shaft and the associated mandril part axially with respect to the other mandril part.

5. Apparatus as claimed in claim 4 wherein said other mandril part has a bore in which said shaft is axially slidable.

6. Apparatus as claimed in claim 5 wherein said mandril parts define a passageway leading to said pipe when the jaws are in axial abutment, said means for applying internal pressure against the pipe comprising passage means in said shaft communicating with said passageway between the mandril parts.

7. Apparatus as claimed in claim 5 wherein said other mandril part is stationary.

8. Apparatus as claimed in claim 5 comprising means connected to said shaft for axially guiding the jaws.

9. Apparatus as claimed in claim 5 comprising stop means operating on said shaft for limiting the relative axial displacement between said mandril parts.

* * * * *